Figure 1:
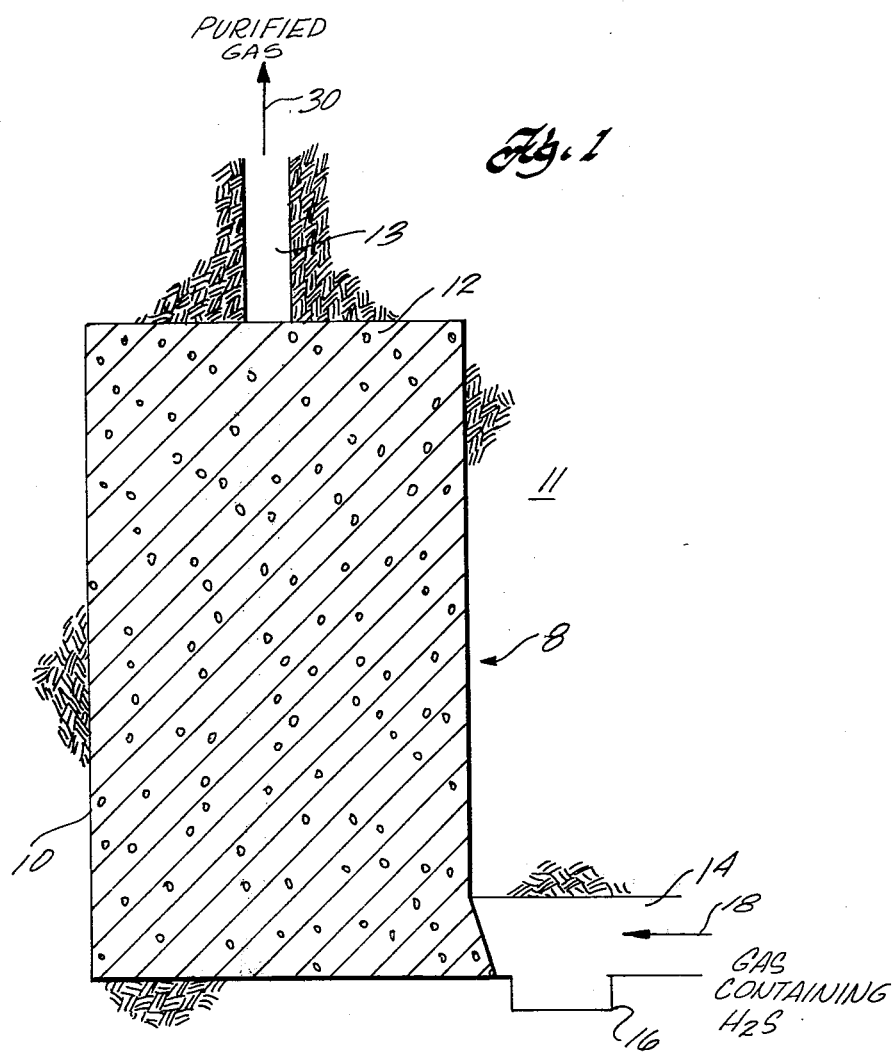

United States Patent [19]

Compton

[11] 4,121,663

[45] Oct. 24, 1978

[54] REMOVING HYDROGEN SULFIDE FROM A GAS

[75] Inventor: Leslie E. Compton, Claremont, Calif.

[73] Assignee: Occidental Oil Shale, Inc., Grand Junction, Colo.

[21] Appl. No.: 780,926

[22] Filed: Mar. 24, 1977

[51] Int. Cl.[2] .............................................. E21B 43/24
[52] U.S. Cl. ................................. 166/259; 166/244 C; 166/265; 299/2
[58] Field of Search ................... 166/244 C, 251, 256, 166/259, 261, 265, 266, 270; 299/2; 48/197 R; 208/11 R; 423/224, 230, 242, 244

[56] References Cited

U.S. PATENT DOCUMENTS

| | | | |
|---|---|---|---|
| 1,479,852 | 1/1924 | Engelhardt | 423/224 |
| 2,581,135 | 1/1952 | Odell | 423/224 |
| 2,812,288 | 11/1957 | Lankford et al. | 208/11 R X |
| 3,072,187 | 1/1963 | Carr | 166/261 X |
| 3,454,958 | 7/1969 | Parker | 166/256 |
| 3,548,938 | 12/1970 | Parker | 166/256 |
| 3,551,093 | 12/1970 | Myers et al. | 423/628 X |
| 3,578,080 | 5/1971 | Closmann | 166/259 X |
| 3,661,423 | 5/1972 | Garret | 299/2 |
| 4,005,752 | 2/1977 | Cha | 166/261 X |
| 4,014,575 | 3/1977 | French et al. | 166/256 X |

Primary Examiner—Stephen J. Novosad
Assistant Examiner—George A. Suchfield
Attorney, Agent, or Firm—Christie, Parker & Hale

[57] ABSTRACT

The hydrogen sulfide concentration of a gas of relatively higher hydrogen sulfide concentration is reduced by introducing the gas to a fragmented permeable mass of oil shale for contacting the oil shale in the substantial absence of free oxygen. This yields a gas with relatively lower hydrogen sulfide concentration which is withdrawn from the fragmented permeable mass of oil shale.

15 Claims, 3 Drawing Figures

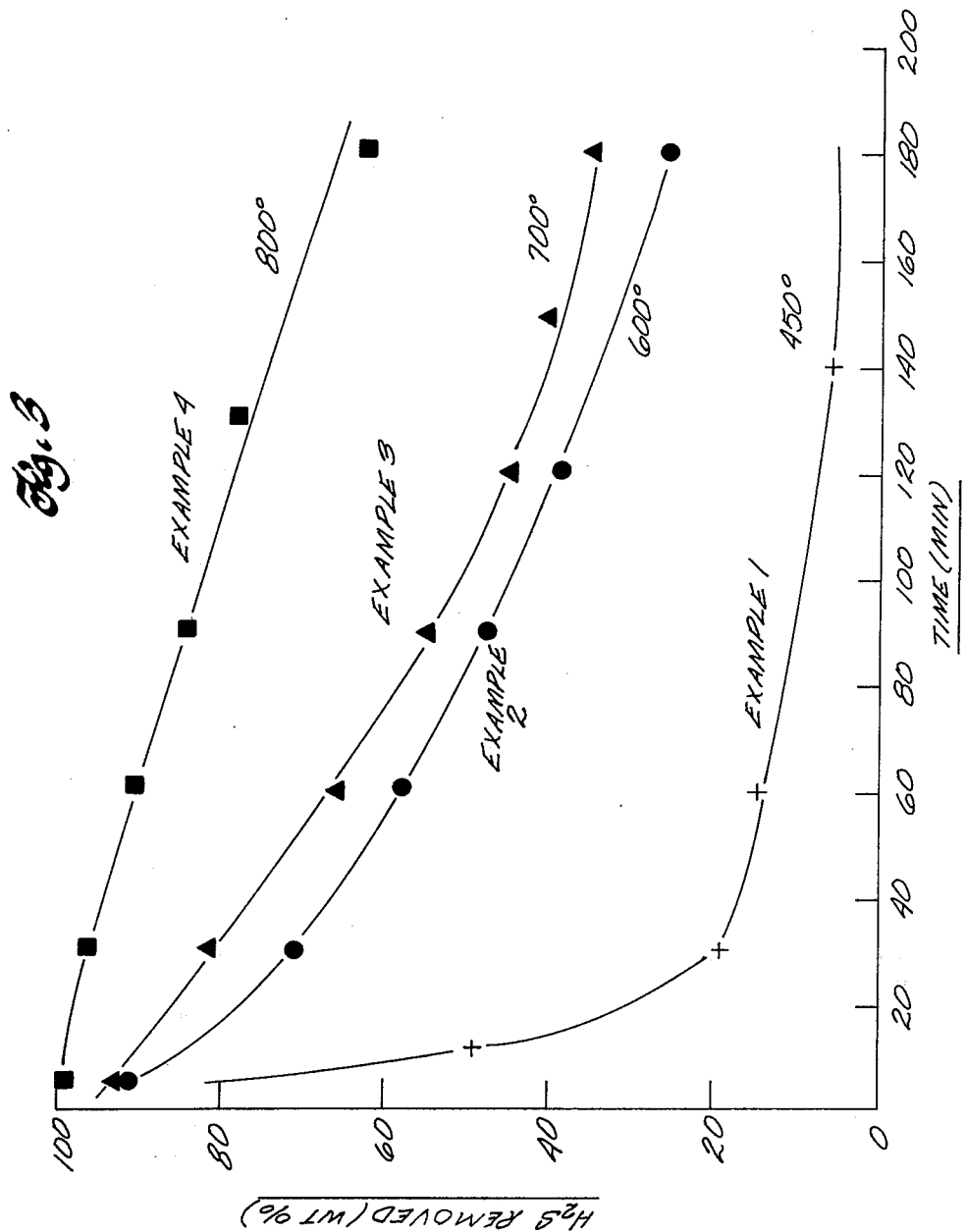

REMOVING HYDROGEN SULFIDE FROM A GAS

CROSS REFERENCES

This application is related to U.S. Patent Application Ser. No. 780,927, filed on Mar. 24, 1977, entitled OXIDIZING HYDROGEN SULFIDE, and filed by Leslie E. Compton, now U.S. Pat. No. 4,086,963; U.S. Patent Application Ser. No. 780,924, filed on Mar. 24, 1977, entitled DECREASING HYDROGEN SULFIDE CONCENTRATION OF A GAS, and filed by Chang Yul Cha, now U.S. Pat. No. 4,086,962; and U.S. Patent Application Ser. No. 780,928, filed on Mar. 24, 1977, entitled LOW TEMPERATURE OXIDATION OF HYDROGEN SULFIDE IN THE PRESENCE OF OIL SHALE, and filed by Leslie E. Compton and William H. Rowan, now U.S. Pat. No. 4,082,146. Each of these three patent applications is incorporated herein by reference.

BACKGROUND OF THE INVENTION

The presence of large deposits of oil shale in the Rocky Mountain region of the United States has given rise to extensive efforts to develop methods of recovering shale oil from kerogen in the oil shale deposits. It should be noted that the term "oil shale" as used in the industry is in fact a misnomer; it is neither shale nor does it contain oil. It is a sedimentary formation comprising marlstone deposit interspersed with layers containing an organic polymer called "kerogen", which upon heating decomposes to produce carbonaceous liquid and gaseous products. It is the formation containing kerogen that is called "oil shale" herein, and the liquid carbonaceous product is called "shale oil".

A number of methods have been developed for processing the oil shale which involve either first mining the kerogen bearing shale and processing the shale above ground, or processing the shale in situ. The latter approach is preferable from the standpoint of environmental impact since the spent shale remains in place, reducing the chance of surface contamination and the requirement for disposal of solid wastes.

The recovery of liquid and gaseous products from oil shale deposits has been described in several patents, one of which is U.S. Pat. No. 3,661,423, issued May 9, 1972 to Donald E. Garrett, assigned to the assignee of this application, and incorporated herein by reference. This patent describes in situ recovery of liquid and gaseous carbonaceous materials from a subterranean formation containing oil shale by mining out a portion of the subterranean formation and then fragmenting and expanding a portion of the remaining formation to form a stationary permeable mass of explosively expanded and fragmented formation particles containing oil shale within the formation, referred to herein as an in situ oil shale retort. Hot retorting gases are passed through the in situ oil shale retort to convert kerogen contained in the oil shale to liquid and gaseous products.

One method of supplying hot retorting gases used for converting kerogen contained in the oil shale, as described in U.S. Pat. No. 3,661,423, includes establishment of a combustion zone in the retort and introduction of an oxygen supplying gaseous feed mixture as a combustion zone feed downwardly into the combustion zone to advance the combustion zone downwardly through the retort. In the combustion zone oxygen in the gaseous feed mixture is depleted by reaction with hot carbonaceous materials to produce heat and combustion gas. By the continued introduction of the oxygen supplying gaseous feed mixture downwardly into the combustion zone, the combustion zone is advanced downwardly through the retort.

The combustion gas and the portion of the gaseous feed mixture which does not take part in the combustion process passes through the retort on the advancing side of the combustion zone to heat the oil shale in a retorting zone to a temperature sufficient to produce kerogen decomposition, called retorting, in the oil shale to gaseous and liquid products and a residue product of solid carbonaceous material.

The liquid products and gaseous products are cooled by the cooler oil shale fragments in the retort on the advancing side of the retorting zone. The liquid carbonaceous products, together with water produced in or added to the retort, are collected at the bottom of the retort and withdrawn to the surface through an access tunnel, drift or shaft. An off gas containing combustion gas generated in the combustion zone, product gas produced in the retorting zone, gas from carbonate decomposition, and gaseous feed mixture which does not take part in the combustion process is also collected at the bottom of the retort and withdrawn to the surface.

The off gas, which contains nitrogen, hydrogen, carbon monoxide, carbon dioxide, methane, water vapor, hydrocarbons, and hydrogen sulfide, and is essentially free of free oxygen, can be used as a fuel or otherwise disposed of, but should first be purged of the hydrogen sulfide, which is a pollutant. The hydrogen sulfide, which can be present in the off gas at concentrations in the range of 1500 to 3000 parts per million (ppm) by volume, is generated from naturally occurring sulfur compounds in oil shale during the heating and combustion in the in situ oil shale retort.

Hydrogen sulfide is an extremely toxic gas with a toxicity greater than that of hydrogen cyanide. It also possesses a powerful, objectionable odor with a threshold for human smell of about 0.0003 ppm. For these reasons emission standards for hydrogen sulfide have been established in many states, including states having oil shale deposits. Thus, various processes for the removal of hydrogen sulfide from gases such as off gas from oil shale retorting have been devised. These processes generally involve absorption of hydrogen sulfide into a liquid such as alkanolamine or high temperature liquid carbonate solutions, adsorption of hydrogen sulfide onto a solid such as iron oxide pellets, and catalytic or noncatalytic oxidation of hydrogen sulfide to sulfur and/or sulfur dioxide such as in the Claus process.

A problem with absorption and adsorption processes is that the agent used for absorbing or adsorbing must, after use, be chemically regenerated or disposed of and replaced. Either of these alternatives can be expensive. A problem with noncatalytic oxidation is that high temperatures are required which may result in oxidation of the hydrocarbon and carbon monoxide constituents of the off gas, thereby substantially reducing the heating value of the off gas. Even with catalytic oxidation, temperatures can be so high that substantial reduction in the heating value of the off gas occurs. Another problem with catalytic oxidation is that the catalyst eventually becomes poisoned, thereby exhibiting reduced activity, and must then either be chemically regenerated or disposed of and replaced.

Thus, there is a need for an economical method for decreasing the hydrogen sulfide concentration of a gas stream, such as the off gas from an in situ oil shale retort, where the method does not substantially reduce the heating value of the gas stream.

SUMMARY OF THE INVENTION

According to the present invention there is provided a method for decreasing hydrogen sulfide concentration of a gas. According to the method of this invention a gas containing a first, relatively higher hydrogen sulfide concentration is introduced to a fragmented, permeable mass of raw oil shale for contacting the raw oil shale in the substantial absence of free oxygen. This yields a gas with a second, relatively lower hydrogen sulfide concentration which is withdrawn from the fragmented mass. The method of this invention is effective for decreasing hydrogen sulfide concentration of a gas containing fuel value components such as off gas from an in situ oil shale retort.

DRAWINGS

Figure 2:
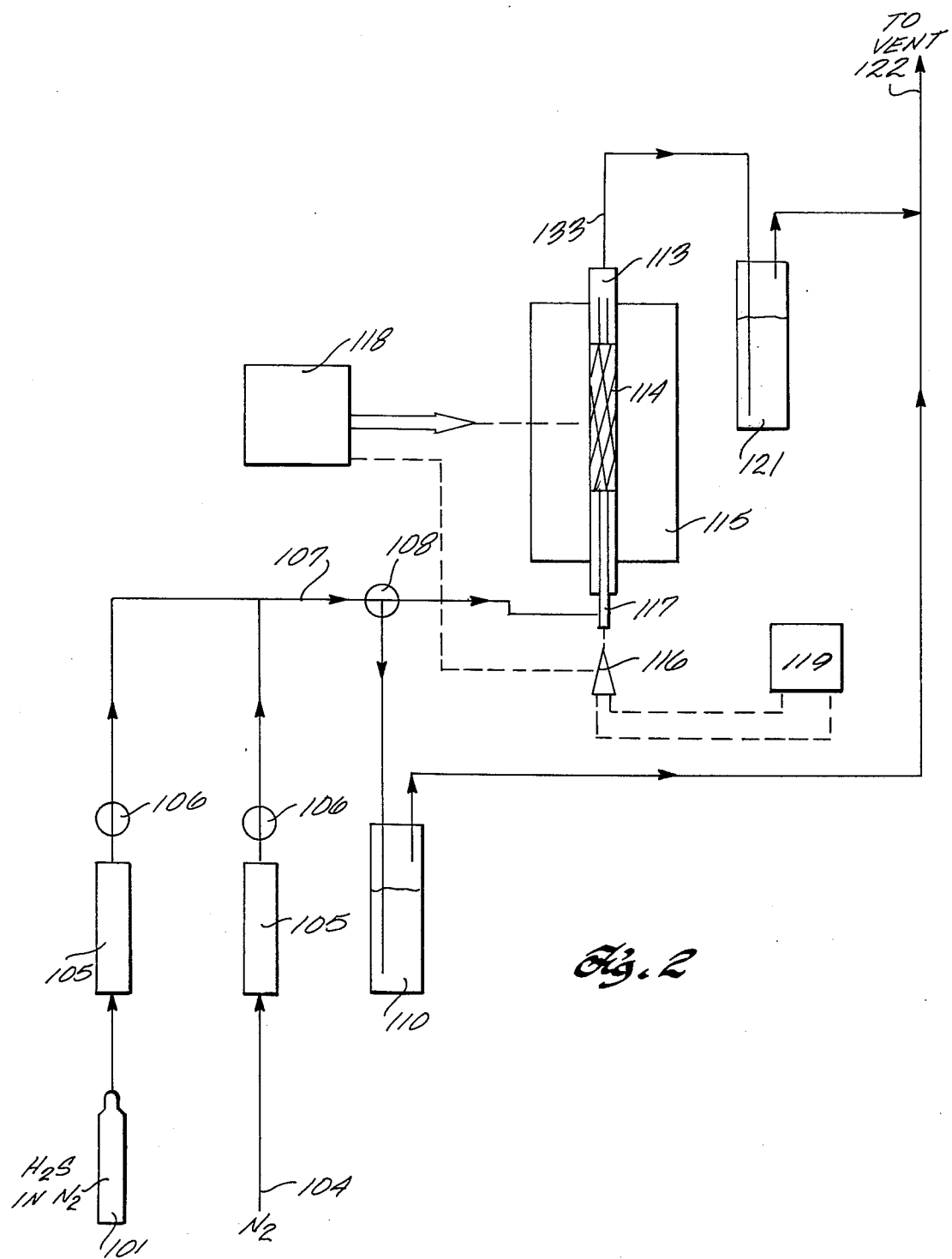

These and other features, aspects and advantages of the present invention will become more apparent upon consideration of the following description, appended claims, and accompanying drawings where:

FIG. 1 schematically represents in vertical crosssection an in situ oil shale retort containing combusted oil shale being used for removing hydrogen sulfide from a gas stream;

FIG. 2 schematically represents apparatus used for demonstrating the efficacy of the method of this invention; and FIG. 3 shows the results of tests conducted to demonstrate the efficacy of the method of this invention.

DESCRIPTION

Referring to FIG. 1, in an embodiment of this invention, an already retorted in situ oil shale retort 8 is in the form of a cavity 10 formed in an unfragmented subterranean formation 11 containing oil shale. The cavity contains an expanded or fragmented permeable mass 12 of formation particles containing oil shale. The cavity 10 can be created simultaneously with fragmentation of the mass of formation particles 12 by blasting by any of a variety of techniques. A desirable technique involves excavating a void within the in situ oil shale retort site and explosively expanding remaining oil shale in the site toward the void. A method of forming an in situ oil retort is described in U.S. Pat. No. 3,661,423. A variety of other techniques can also be used.

A conduit 13 communicates with the top of the fragmented mass of formation particles. During the retorting operation of the retort 8, a combustion zone is established in the retort and advanced by introducing as a combustion zone feed a gaseous feed containing an oxygen supplying gas, such as air or air mixed with other gases, into the in situ oil shale retort through the conduit 13. As the gaseous feed is introduced to the retort, oxygen oxidizes carbonaceous material in the oil shale to produce combusted oil shale and combustion gas. Heat from the exothermic oxidation reactions carried by flowing gases advances the combustion zone downwardly through the fragmented mass of particles.

Combustion gas produced in the combustion zone and any unreacted portion of the oxygen supplying gaseous feed are passed through the fragmented mass of particles on the advancing side of the combustion zone to establish a retorting zone on the advancing side of the combustion zone. Kerogen is retorted in the retorting zone to liquid and gaseous products.

There is a drift 14 in communication with the bottom of the retort. The drift contains a sump 16 in which liquid products are collected to be withdrawn for further processing. An off gas containing gaseous products, combustion gas, gas from carbonate decomposition, and any unreacted portion of the gaseous feed is also withdrawn from the in situ oil shale retort 8 by way of the drift 14. The off gas can contain large amounts of nitrogen with lesser amounts of hydrogen, carbon monoxide, carbon dioxide, methane, higher hydrocarbons, water vapor, and sulfur compounds such as hydrogen sulfide. The off gas can also contain particulates and hydrocarbon containing aerosols. It is desirable to remove at least a portion of the hydrogen sulfide from the off gas so the off gas can be used as fuel gas for power generation in a work engine such as a gas turbine, or if the gas is flared, to limit the sulfurous emission.

At the end of retorting operations at least part of the oil shale in the retort 8 is at an elevated temperature which can be in excess of 1000° F. The hottest region of the retort is often near the bottom, and a somewhat cooler region is at the top due to continual cooling by gaseous combustion zone feed during retorting and conduction of heat to adjacent shale. The oil shale in the retort 8 gradually cools toward ambient temperature when retorting and combustion are complete.

The retort illustrated in FIG. 1 has had retorting and combustion operations completed and contains a combusted, fragmented permeable mass of formation particles containing oil shale. As used herein, the term "raw oil shale" refers to oil shale which has not been subjected to any processing affecting the chemical composition of the oil shale. The term "retorted oil shale" refers to oil shale heated to a sufficient temperature to decompose kerogen in an environment substantially free of free oxygen so as to leave a solid carbonaceous residue. The term "combusted oil shale" refers to oil shale of reduced carbon content due to oxidation by a gas containing free oxygen. The term "treated oil shale" refers to oil shale treated to remove organic materials and includes retorted and/or combusted oil shale. An individual particle containing oil shale can have a core of retorted oil shale and an outer "shell" of combusted oil shale. Such can occur when oxygen has diffused only part way through the particle during the time it is at an elevated temperature and in contact with an oxygen supplying gas.

A gas stream 18 containing hydrogen sulfide, such as off gas from an active oil shale retort is introduced through the drift 14 to the already treated retort 8. There is sufficient differential pressure between the top and bottom of the retort to cause the gas stream to flow through the drift 14, which is in communication with the bottom of the retort, and upwardly through the retort 8 to be withdrawn from the retort through the conduit 13, which is in communication with the upper boundary of the fragmented mass of treated oil shale particles in the retort 8. For economy, the conduit used for introducing oxygen supplying gaseous feed to the retort 8 during the retorting operation is utilized to withdraw gas 30 of reduced hydrogen sulfide content from the retort. Similarly, the tunnel used for withdrawing gaseous products from the retort 8 during the retorting operation is utilized to introduce hydrogen sulfide containing gas to the retort.

When the hydrogen sulfide containing gas is off gas from an active oil shale retort, oil aerosols and/or particulates which can be contained in the off gas can be removed from the off gas prior to introduction into the retort. This is done to prevent deposition of oil and/or particulates on the fragmented mass of oil shale particles in the retort, which can reduce the activity of the particles in removing hydrogen sulfide from the off gas.

As the hydrogen sulfide containing gas stream 18 passes through the retort in the substantial absence of free oxygen, hydrogen sulfide is removed from the gas stream. Removal of hydrogen sulfide from a gas stream can occur even at ambient temperatures.

The gas containing hydrogen sulfide contacts oil shale in the substantial absence of free oxygen to avoid oxidation of fuel value components of the hydrogen sulfide containing gas stream. Thus without free oxygen being present, oxidation of components such as hydrogen, carbon monoxide, and hydrocarbons contained in the gas stream is avoided.

As used herein, by the expression "substantial absence of free oxygen", there is meant that substantially no molecular oxygen is present when the gas stream contacts oil shale.

As the temperature at which hydrogen sulfide containing gas contacts oil shale increases, the rate at which hydrogen sulfide contained in the gas stream 18 is removed increases, with all other process conditions maintained constant. When temperatures above ambient are desired to achieve high rates of conversion, the heat for increasing gas temperature can be at least partly obtained from the sensible heat remaining in the oil shale retort 8. If the temperature in the retort 8 is insufficient, or there is insufficient residence time in the retort 8 to achieve the desired rate of conversion, the hydrogen sulfide containing gas can be passed through additional retorts in series and/or parallel, or recirculated several times in a single retort to achieve maximum removal.

The hydrogen sulfide can be removed from gas stream 18 at the desired temperature by passing the hydrogen sulfide containing gas through a portion of the retort having the desired temperature.

The gas stream 30 withdrawn from the retort has a relatively lower hydrogen sulfide concentration and a lower total sulfur content than the hydrogen sulfide containing gas 18 introduced into the retort 8. It is believed that this occurs because hydrogen sulfide combines with components of oil shale activated by the retorting and combustion processes to yield sulfides and other sulfur forms. It is believed that in addition to treated oil shale, raw oil shale is effective in reducing the hydrogen sulfide concentration of a gas, although at a lower rate than with treated oil shale.

Preferably the hydrogen sulfide containing gas is introduced to the hottest portion of the fragmented permeable mass in the retort to minimize pressure drop through the retort and the cost of passing gas through the retort. By introducing the gas to the hottest portion of the retort, heat is transferred by the flowing gas to the cooler portions of the retort, with the result that the fragmented permeable mass eventually has a substantially uniform temperature gradient with the temperature decreasing in the direction of movement of the gas. This results in reduced pressure drop across the retort because the volumetric flow rate of the hydrogen sulfide containing gas through the retort decreases as the temperature of the fragmented mass decreases. Also the void fraction of the fragmented permeable mass increases due to thermal contraction of the formation particles as the mass of particles cools. Thus the cross sectional area available for flow of gas through the retort increases.

Therefore, as shown in FIG. 1, when a fragmented permeable mass in an in situ oil shale retort is retorted from top to bottom, preferably the hydrogen sulfide containing gas is introduced to the bottom of the retort, and purified gas is withdrawn from the top of the retort. An advantage of introducing the gas to the bottom of the retort, as shown in FIG. 1, is that off gas from the bottom of an adjacent active retort can be directly introduced to the bottom of the spent retort 8 without having to incur the capital and operating expenses of transferring the off gas to the surface.

The method of this invention has many advantages over prior art processes described above. By using oil shale to remove hydrogen sulfide from gas streams such as off gas from an in situ oil shale retort, the purchase of a hydrogen sulfide absorbent or adsorbent is avoided. Furthermore, when oil shale contained in an in situ oil shale is used, the oil shale remains in the ground, thereby eliminating disposal problems. In addition, vast quantities of oil shale are available. Thus regeneration of oil shale, even if its activity is greatly reduced by poisoning, is unnecessary. A long residence time of the hydrogen sulfide containing gas can be utilized to achieve high conversion. In addition, rather than preheating the hydrogen sulfide containing gas, the sensible heat of treated oil shale, which otherwise might not be used, can be utilized to heat the hydrogen sulfide containing gas. Another advantage of the method of this invention is that hydrogen, carbon monoxide and hydrocarbons contained in the hydrogen sulfide containing gas are not oxidized during removal of the hydrogen sulfide because of the absence of free oxygen. Therefore, the fuel value of the hydrogen sulfide containing gas is not significantly reduced.

The following examples demonstrate the efficacy of oil shale in removing hydrogen sulfide from a gas stream in the substantial absence of free oxygen.

EXAMPLES 1–4

The apparatus for conducting examples 1–4 is shown in FIG. 2. Bottled gas was provided by tank 101 which contained 1.2 volume percent hydrogen sulfide in nitrogen. Dry nitrogen was provided from line 104. Gases from tank 101 and line 104 were metered for 3 hours with flow meters 105 and control valves 106 and blended together to form 0.05 scfm (standard cubic feet per minute) at 70° F. of a gas mixture in line 107 containing 1000 parts per million (ppm) by volume $H_2S$ in nitrogen. The gas mixture in line 107 passed to a three-way valve 108 where a portion was intermittently diverted to a first sodium hydroxide trap 110 having a pH of 14. The first sodium hydroxide trap 110 was used to determine the inlet hydrogen sulfide concentration.

The gas mixture not diverted passed to a $\frac{7}{8}$ inch inner diameter quartz reactor 113 containing a bed 114 of oil shale particles. The temperature of the oil shale bed was maintaned at a desired level with a single zone, one inch internal diameter electric furnace 115. Shale bed temperatures were scanned with a thermocouple probe 116 inserted in a thermo-well 117. The temperature in the bed was controlled by means of a temperature controller 118, and temperature was monitored with a temperature indicator 119.

Effluent gas from the shale bed passed via line 133 to a second sodium hydroxide 121 trap, and then was vented through line 122 to a hood (not shown). The second sodium hydroxide trap 121 removed hydrogen sulfide from the reactor effluent.

The sulfur content in the two traps was determined using a KIO$_3$ titration to a starch-iodine end point. The sample was acidified with hydrochloric acid prior to titration.

For these examples 23.6 grams of $-3 + 8$ mesh oil shale combusted at 1600° F. with oxygen were placed in the reactor. The reactor temperature used was 450° F. for Example 1, 600° F. for Example 2, 700° F. for Example 3, and 800° F. for Example 4. The traps were periodically sampled to determine the hydrogen sulfide content of the gas mixture 107 feed to the reactor and the hydrogen sulfide content of the effluent from the reactor.

The instantaneous percentage by weight of hydrogen sulfide removed from the feed versus time after initiation of feed to the pyrolysis reactor is presented for Examples 1-4 in FIG. 3. The results presented in FIG. 3 show that when the hydrogen sulfide containing gas contacted combusted oil shale, a portion of the hydrogen sulfide was removed. The results also show that as the reactor temperature increased, hydrogen sulfide removal increased. The results in FIG. 3 also indicate that efficiency of hydrogen sulfide removal deteriorated with increased exposure to hydrogen sulfide.

EXAMPLES 5-7

Using the apparatus and method used for Examples 1-4, a reactor feed gas mixture containing 20,000 ppm hydrogen sulfide and nitrogen was introduced to the reactor 114 at a rate of 0.015 cfm at 70° F. for 3 hours. The reactor contained 20 grams of the same type of shale used for Examples 1-4. The temperature used for each example is presented in Table 1.

The total sulfur and sulfide concentration of the oil shale in the reactor, both before and after each example, was determined. Sulfur concentration was determined with ASTM method D-3177. The initial sulfur content of the shale was 0.50 weight percent. The sulfide concentration of the shale was determined using an acid evolution method where the hydrogen sulfide released was trapped in a calcium chloride solution which was then titrated to a starch end point with KIO$_3$. The initial sulfide concentration of the oil shale was 0.01 weight percent.

The amount of sulfur removed by the shale for each example is presented in Table 1, as well as the amount of sulfur removal which was present in the sulfide form. The values in Table 1 are based on the difference between the final and initial sulfur and sulfide content of the oil shale in the reactors.

The results of Examples 5-7 show that when an oil shale is contacted with a gas containing hydrogen sulfide, a portion of the sulfur in the gas is removed from the gas and retained by the oil shale. Also, the results indicate that as reactor temperature is increased, more hydrogen sulfide is removed from the gas stream. The results also indicate that only a portion of the hydrogen sulfide removed is retained by the oil shale in the sulfide form.

TABLE I

| Example | Reaction Temperatures (° F) | Sulfur Removal by Shale | |
|---|---|---|---|
| | | Total sulfur:Shale Weight Ratio | Sulfide:Shale Weight Ratio |
| 5 | 450 | $0.64 \times 10^{-2}$ | $0.27 \times 10^{-2}$ |
| 6 | 600 | $1.35 \times 10^{-2}$ | $1.02 \times 10^{-2}$ |
| 7 | 800 | $2.26 \times 10^{-2}$ | $1.43 \times 10^{-2}$ |

Although this invention has been described in considerable detail with reference to certain embodiments thereof, other versions of the invention are within the scope of this invention. Thus the spirit and scope of the appended claims should not necessarily be limited to the description of the preferred embodiments.

What is claimed:

1. A method for recovering gaseous products from a first in situ oil shale retort in a subterranean formation containing oil shale, said first in situ retort containing an explosively expanded and fragmented permeable mass of particles containing oil shale and having a combustion zone and a retorting zone advancing therethrough, the method comprising the steps of:
    (a) introducing into the first in situ oil shale retort on the trailing side of the combustion zone a combustion zone feed comprising oxygen to advance the combustion zone through the fragmented mass of particles and produce combustion gas in the combustion zone;
    (b) passing said combustion gas and any unreacted portion of the combustion zone feed through a retorting zone in the fragmented mass of particles on the advancing side of the combustion zone, wherein oil shale is retorted and gaseous products are produced;
    (c) withdrawing a retort off gas comprising said gaseous products, combustion gas and any gaseous unreacted portions of the combustion zone feed from the first in situ oil shale retort from the advancing side of the retorting zone; and
    (d) reducing the hydrogen sulfide concentration of retort off gas from the first retort by the step of introducing at least a portion of the retort off gas from the first retort into a second in situ oil shale retort containing a fragmented permeable mass of formation particles containing raw oil shale in a subterranean formation containing oil shale to contact raw oil shale in the second retort in the substantial absence of free oxygen to yield gas with a hydrogen sulfide concentration relatively lower than the hydrogen sulfide concentration of the off gas from the first retort, and withdrawing such gas having a relatively lower hydrogen sulfide concentration than the retort off gas from the second retort.

2. A method of decreasing the hydrogen sulfide concentration of a gas comprising the steps of:
    introducing a gas containing relatively higher hydrogen sulfide concentration to a fragmented permeable mass of raw oil shale for contacting the raw oil shale in the substantial absence of free oxygen, wherein a gas having a hydrogen sulfide concentration relatively lower than the hydrogen sulfide concentration of the introduced gas is produced; and
    withdrawing such gas with relatively lower hydrogen sulfur concentration from the fragmented permeable mass of raw oil shale.

3. The method of claim 2 in which the gas containing relatively higher hydrogen sulfide and total sulfur concentration contains fuel value components.

4. A method for removing hydrogen sulfide from a gas stream comprising the steps of:
   forming an in situ oil shale retort in a subterranean formation containing oil shale, said in situ retort containing a fragmented permeable mass of formation particles containing raw oil shale;
   contacting, in the substantial absence of free oxygen, formation particles containing raw oil shale in the in situ retort with a gas with relatively higher hydrogen sulfide and total sulfur concentration to yield gas having a hydrogen sulfide and total sulfur concentration relatively lower than the hydrogen sulfide and total sulfur concentration of the introduced gas; and
   withdrawing such gas having relatively lower hydrogen sulfide and total sulfur concentration from the in situ oil shale retort.

5. A method of decreasing the hydrogen sulfide concentration of a gas comprising the steps of:
   introducing a gas having a first hydrogen sulfide concentration to a fragmented permeable mass of raw oil shale for contacting the raw oil shale in the substantial absence of free oxygen, has been treated to remove organic material prior to introducing the gas to the mass of oil shale, wherein a gas having a second hydrogen sulfide concentration is produced; and
   withdrawing such gas having the second hydrogen sulfide concentration from the fragmented permeable mass of raw oil shale, wherein the first hydrogen sulfide concentration is higher than the second hydrogen sulfide concentration.

6. The method of claim 5 in which the gas having a first hydrogen sulfide concentration contains fuel value components.

7. A method of decreasing the hydrogen sulfide concentration of a gas comprising the steps of:
   introducing a gas containing relatively higher hydrogen sulfide concentration to a fragmented permeable mass of raw oil shale for contacting the raw oil shale in the substantial absence of free oxygen, wherein a gas having a hydrogen sulfide concentration relatively lower than the hydrogen sulfide concentration of the introduced gas is produced; and
   withdrawing such gas having a relatively lower hydrogen sulfide concentration from the fragmented permeable mass of raw oil shale.

8. The method of claim 7 in which the gas containing relatively higher hydrogen sulfide and total sulfur concentration contains fuel value components.

9. A method of decreasing the hydrogen sulfide concentration of a gas comprising the steps of:
   introducing a gas having a first hydrogen sulfide concentration to a fragmented permeable mass of raw oil shale for contacting the raw oil shale in the substantial absence of free oxygen, wherein a gas having a second hydrogen sulfide concentration is produced; and
   withdrawing such gas having the second hydrogen sulfide concentration from the fragmented permeable mass of oil shale, wherein the first hydrogen sulfide concentration is higher than the second hydrogen sulfide concentration.

10. The method of claim 9 in which the gas having a first hydrogen sulfide contains fuel value components.

11. A method of decreasing the hydrogen sulfide concentration of a gas, the gas containing hydrogen sulfide and water, comprising the steps of:
    introducing a gas containing water and relatively higher hydrogen sulfide concentration to a fragmented permeable mass of raw oil shale for contacting the raw oil shale in the substantial absence of free oxygen, wherein a gas having a second hydrogen sulfide concentration relatively lower than the hydrogen sulfide concentration of the introduced gas is produced; and
    withdrawing such gas having a relatively lower hydrogen sulfide concentration from the fragmented permeable mass of oil shale.

12. A method of decreasing the hydrogen sulfide concentration of off gas from an in situ oil shale retort, the off gas containing hydrogen sulfide, particulates, and hydrocarbon containing aerosols, comprising the steps of:
    introducing such off gas containing relatively higher hydrogen sulfide concentration to a fragmented permeable mass of raw oil shale for contacting the raw oil shale in the substantial absence of free oxygen, wherein a gas having a hydrogen sulfide concentration relatively lower than the hydrogen sulfide concentration of the off gas is produced; and
    withdrawing such gas having a relatively lower hydrogen sulfide concentration from the fragmented permeable mass of raw oil shale.

13. The method of claim 12 including the step of removing particulates from the off gas before introducing the off gas to the fragmented permeable mass.

14. The method of claim 13 including the step of removing hydrocarbon containing aerosols from the off gas before introducing the off gas to the fragmented permeable mass.

15. The method of claim 12 including the step of removing hydrocarbon containing aerosols from the off gas before introducing the off gas to the fragmented permeable mass.

* * * * *

UNITED STATES PATENT AND TRADEMARK OFFICE
CERTIFICATE OF CORRECTION

PATENT NO. : 4,121,663
DATED : October 24, 1978
INVENTOR(S) : Leslie E. Compton

It is certified that error appears in the above-identified patent and that said Letters Patent are hereby corrected as shown below:

Column 6, line 59, "maintaned" should be -- maintained --.

Column 8, line 67, "sulfur" should be -- sulfide --.

Column 9, lines 27, 28, 29 "has been treated to remove organic material prior to introducing the gas to the mass of oil shale" should be deleted.

Signed and Sealed this

Thirtieth Day of January 1979

[SEAL]

Attest:

RUTH C. MASON
Attesting Officer

DONALD W. BANNER
Commissioner of Patents and Trademarks